(12) United States Patent
Chen et al.

(10) Patent No.: US 7,766,516 B2
(45) Date of Patent: Aug. 3, 2010

(54) DIFFUSION PLATE OF BACKLIGHT STRUCTURE AND DISPLAY DEVICE USING THE SAME

(75) Inventors: Chih-Kuang Chen, Hsin-Chu (TW); Hsin-Wu Lin, Hsin-Chu (TW)

(73) Assignee: AU Optronics Corp., Hsin-chu (TW)

( * ) Notice: Subject to any disclaimer, the term of this patent is extended or adjusted under 35 U.S.C. 154(b) by 260 days.

(21) Appl. No.: 11/889,681

(22) Filed: Aug. 15, 2007

(65) Prior Publication Data
US 2008/0112188 A1  May 15, 2008

(30) Foreign Application Priority Data
Nov. 9, 2006  (TW)  ................. 95141564 A

(51) Int. Cl.
*F21V 7/04* (2006.01)
(52) U.S. Cl. .................. 362/330; 362/97.3; 362/625
(58) Field of Classification Search .......... 362/625, 362/626, 612, 330, 628, 97.1–97.4, 615, 362/339
See application file for complete search history.

(56) References Cited

U.S. PATENT DOCUMENTS

| | | | |
|---|---|---|---|
| 6,923,548 B2 | 8/2005 | Lim | |
| 2005/0002205 A1* | 1/2005 | Yu et al. | 362/555 |
| 2006/0002146 A1 | 1/2006 | Baba | |
| 2006/0002148 A1* | 1/2006 | Kim et al. | 362/615 |
| 2006/0012286 A1 | 1/2006 | Cull et al. | |
| 2006/0077692 A1 | 4/2006 | Noh et al. | |
| 2006/0164840 A1 | 7/2006 | Song et al. | |

FOREIGN PATENT DOCUMENTS

| | | |
|---|---|---|
| JP | 10-082915 | 3/1998 |
| JP | 2000-098105 | 4/2000 |
| TW | 248538 | 6/1995 |

* cited by examiner

*Primary Examiner*—Bao Q Truong
(74) *Attorney, Agent, or Firm*—Bacon & Thomas, PLLC

(57) ABSTRACT

A diffusion plate of a backlight structure and a display device using the same are provided. The diffusion plate is used in the backlight structure having several light emitting diodes. The diffusion plate includes a main body with many depression structures positioned on a surface of the main body. The surface faces the light emitting diodes. Each depression structure is positioned above the corresponding light emitting diode and includes an inclined surface. An inclined angle is formed between each inclined surface and a central axis of the corresponding light emitting diode for refracting the light emitted by the corresponding light emitting diode.

31 Claims, 3 Drawing Sheets

DIFFUSION PLATE OF BACKLIGHT STRUCTURE AND DISPLAY DEVICE USING THE SAME

This application claims the benefit of Taiwan Patent Application Serial No. 95141564, filed Nov. 9, 2006, the subject matter of which is incorporated herein by reference.

BACKGROUND OF THE INVENTION

1. Field of the Invention

The invention relates in general to a diffusion plate of a backlight structure and a display device using the same, and more particularly to a diffusion plate of a backlight structure capable of uniformizing light and a display device using the same.

2. Description of the Related Art

Owing to the progress in the technology of liquid crystal displays (LCDs), and the advantages of LCDs, such as light weight, small volume, lower energy consumption and low radiation, the LCDs are widely applied to all kinds of electronic products, like personal digital assistants (PDAs), notebooks, digital cameras, mobile phones, computer screens and liquid crystal televisions. Furthermore, researches are carried out enthusiastically, and large-scale facilities are used to manufacture the LCDs in the industry, such that the quality of the LCDs is improved, and the cost is lowered. Consequently, the application field of the LCDs expands rapidly. However, the liquid crystal display panel in an LCD is non-self-luminous, and therefore the backlight module is needed for providing light in order to display images. Generally, a cold cathode fluorescent lamp (CCFL) or a light emitting diode (LED) is the most common light source in the backlight module. Due to the advantages of the light emitting diode, e.g. low electricity consumption and high brightness, the backlight module with the light emitting diode as the light source has become an important research and development subject.

However, the light emitting diode is a point light source, hence a phenomenon called line-mura would easily occur between the light emitting diodes in the backlight module, that is, the brightness of the light provided by the backlight module is not uniform. Generally, to reduce line-mura is to decrease the distance between the light emitting diodes. As a result, the number of the light emitting diodes increases significantly, and the cost of the LCD increases accordingly.

There are several backlight modules for uniformizing light in the prior art. In US Patent Publication Number 20060002148 published on Jan. 5, 2006, an optical member, a backlight assembly having the optical member and a display apparatus having the backlight assembly are disclosed. The optical member includes several luminance uniformity enhancing members. A recessed surface and a light reflecting layer of each luminance uniformity enhancing member are used for uniformizing light. However, the light has been reflected a number of times before passing through a light guide plate, and then finally enters the display panel to display images. In this manner, the brightness of light provided by the backlight assembly is reduced.

SUMMARY OF THE INVENTION

The invention is directed to a diffusion plate of a backlight structure and a display device using the same. Several depression structures are formed on a main body of the diffusion plate for refracting light into many directions. Therefore, the display device has advantages such as decreasing the light loss, reducing the volume and improving the display quality without increasing the manufacturing cost.

According to the present invention, a diffusion plate of a backlight structure is provided. The backlight structure includes several light emitting diodes. The diffusion plate includes a main body with several depression structures. The depression structures are positioned on a surface of the main body, and the surface faces the light emitting diodes. Each depression structure is positioned over the corresponding light emitting diode and has an inclined surface. An inclined angle is formed between each inclined surface and a central axis of the corresponding light emitting diode for refracting light emitted by the corresponding light emitting diode.

According to the present invention, a backlight structure including a light source assembly and a diffusion plate is provided. The light source assembly includes several light emitting diodes. The diffusion plate is positioned over the light source assembly and includes a main body. The main body is disposed at a distance from the light emitting diodes. Several depression structures are formed on a surface of the main body. The surface faces the light emitting diodes. Each depression structure is positioned over the corresponding light emitting diode and includes an inclined surface. An inclined angle is formed between each inclined surface and a central axis of the corresponding light emitting diode for refracting light emitted by the corresponding light emitting diode.

According to the present invention, a display device including a display panel, a light source assembly and a diffusion plate is provided. The light source assembly is disposed under the display panel and includes several light emitting diodes. The diffusion plate is positioned between the light source assembly and the display panel and includes a main body. The main body is disposed at a distance from the light emitting diodes. Several depression structures are formed on a surface of the main body, and the surface faces the light emitting diodes. Each depression structure is positioned over the corresponding light emitting diode and includes an inclined surface. An inclined angle is formed between each inclined surface and a central axis of the corresponding light emitting diode for refracting light emitted by the corresponding light emitting diode.

The invention will become apparent from the following detailed description of the preferred but non-limiting embodiments. The following description is made with reference to the accompanying drawings.

DETAILED DESCRIPTION OF THE INVENTION

First Embodiment

Figure 1:
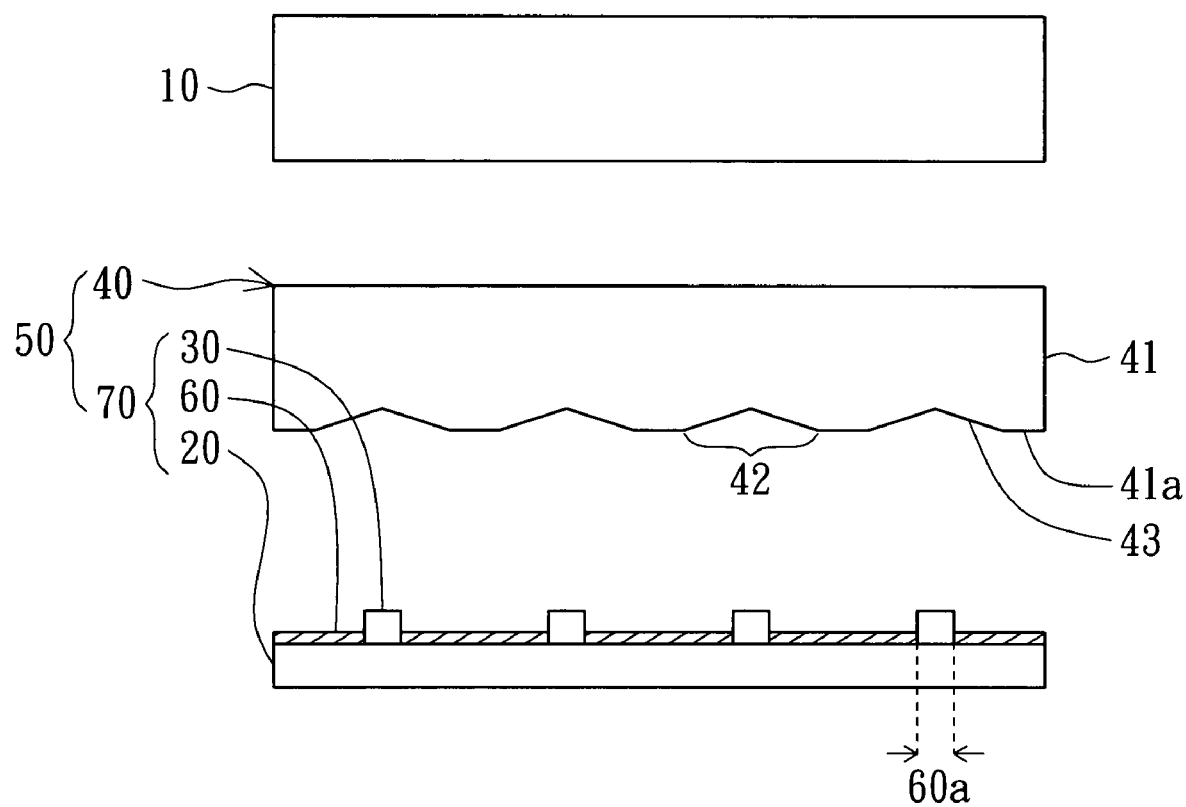
FIG. 1 illustrates a display device according to a first embodiment of the present invention.
Figure 2:
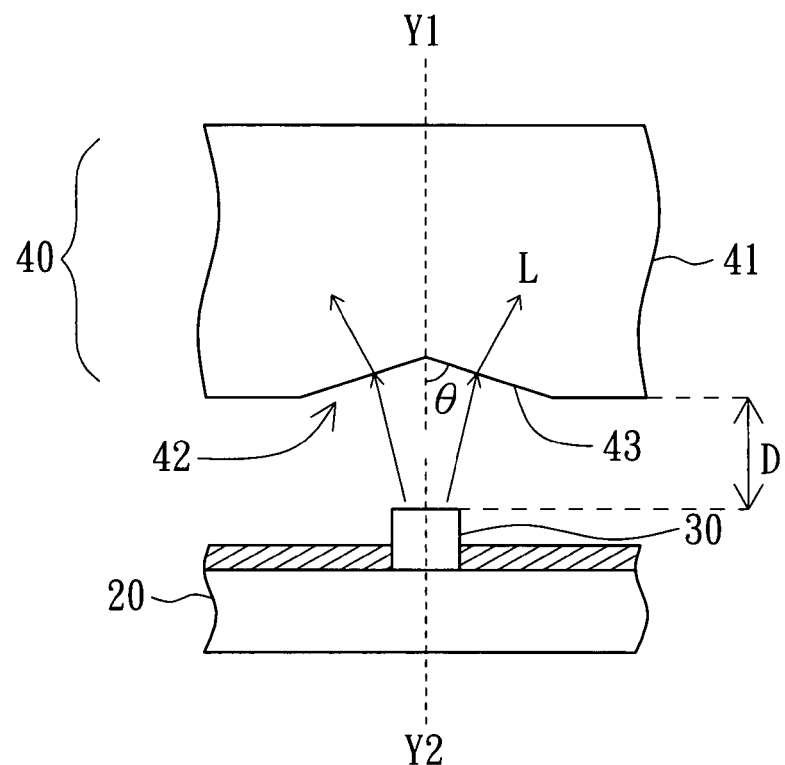
FIG. 2 illustrates part of the diffusion plate and the circuit board in FIG. 1.

Referring to FIG. 1 and FIG. 2 at the same time, FIG. 1 illustrates a display device according to a first embodiment of the present invention while FIG. 2 illustrates part of the diffusion plate and the circuit board in FIG. 1. The display device 100 includes a display panel 10, a light source assembly 70 and a diffusion plate 40. The light source assembly 70 disposed under the display panel 10 includes several light emitting diodes (LED) 30 and a circuit board 20. The light emitting diodes 30 are top emitting light emitting diodes and are disposed over the circuit board 20 for providing light L (shown in FIG. 2) passing through the diffusion plate 40 and the display panel 10. The diffusion plate 40 is positioned between the light source assembly 70 and the display panel 10 and includes a main body 41. The main body 41 is positioned over the circuit board 20 and is disposed at a distance D (shown in FIG. 2) from the light emitting diodes 30. The distance D is substantially greater than or equal to 10 mm, so that the light L diffuses at a certain level before entering the main body 41. The main body 41 has several depression structures 42 positioned on a surface 41a of the main body 41. The surface 41a faces the light emitting diodes 30. The light source assembly 70 and the diffusion plate 40 form a backlight structure 50 of the display device 100.

As shown in FIG. 2, each depression structure 42 is symmetric and has a symmetrical axis Y1. Each symmetrical axis Y1 coincides with a central axis Y2 of one light emitting diode 30. In other words, each depression structure 42 is positioned over the corresponding light emitting diode 30. Furthermore, each depression structure 42 includes an inclined surface 43 for refracting the light L. An inclined angle θ is formed between the inclined surface 43 and the central axis Y2 of the corresponding light emitting diode 30; similarly, the inclined angle θ is formed between the inclined surface 43 and the symmetrical axis Y1 of the depression structure 42 as well. The inclined angle θ is substantially greater than 45°; that is, the angle between two symmetric inclined surfaces 43 is obtuse. Moreover, the main body 41 of the diffusion plate 40 is transparent. After refracted by the depression structure 42, the light L enters and passes through the main body 41 through the inclined surface 43 of the corresponding depression structure 42 or the surface 41a of the main body 41. As a result, the light is diffused and uniformized.

Figure 3:
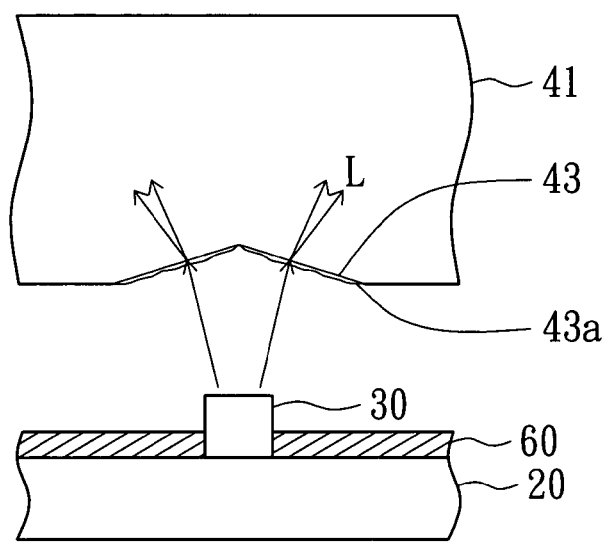
FIG. 3 illustrates the inclined surface in FIG. 2 having a micro-structure.

In the display device 100 of the present embodiment, the light source assembly 70 further includes a reflection sheet 60 disposed on the circuit board 20 for reflecting the light L. Therefore, more light L enters and passes through the main body 41. As shown in FIG. 1, the reflection sheet 60 has several openings 60a, and the light emitting diodes 30 are disposed on the circuit board 20 through the openings 60a. Furthermore, the depression structures 42 are exemplified by cones. However, anyone who is skilled in the art of the present invention can understand that the present invention is not limited thereto. The depression structures 42 can also be exemplified by polyhedral cones or any other shapes that are symmetric to the symmetrical axis Y1. Preferably, a rough micro-structure is formed on the inclined surface 43 of each depression surface 42. Referring to FIG. 3, the inclined surface in FIG. 2 having the micro-structure is illustrated. When passing through the inclined surface 43, the light L is refracted into several directions by the micro-structure 43a, so as to further uniformize the light L.

In the display device 100 according to the first embodiment of the present invention, the light L is refracted into several directions by the inclined surface 43 and the micro-structure 43a of the depression structure 42. Therefore, the light L is uniformized, line-mura is decreased, and the image quality of the display device 100 is improved. Further, the distance required for diffusing the light L before entering the main body 41 is reduced. In other words, the distance D between the main body 41 and the light emitting diodes 30 is reduced, and the thickness of the backlight structure 50 is decreased. The volume of the display device 100 is reduced accordingly.

Second Embodiment

Figure 4:
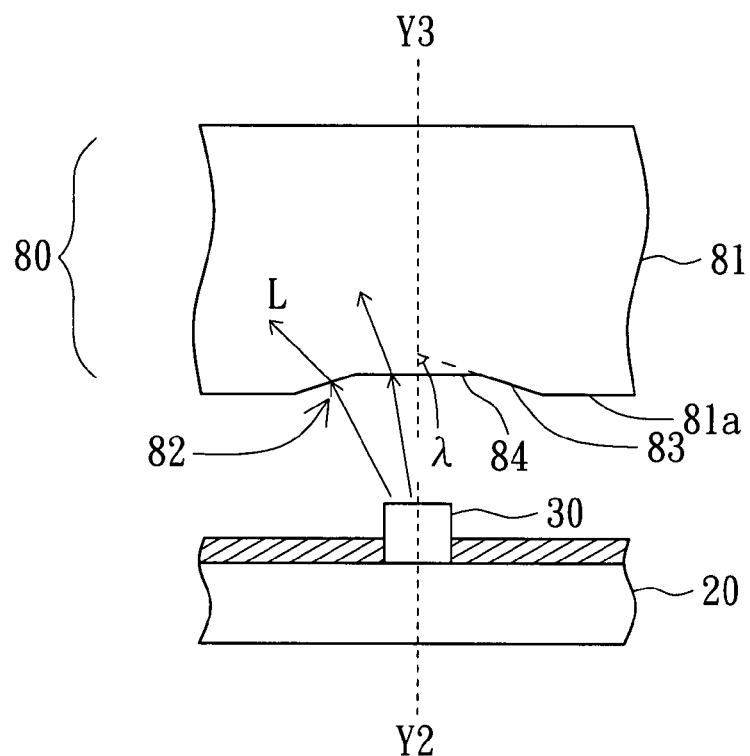
FIG. 4 illustrates part of a diffusion plate and a circuit board according to a second embodiment of the present invention.

The display device according to a second embodiment of the present invention and the display device 100 of the first embodiment (as shown in FIG. 1) are different in the depression structures. Referring to FIG. 4, part of the diffusion plate and the circuit board according to the second embodiment of the present invention are illustrated. Each depression structure 82 includes an inclined surface 83 and a plane 84. An inclined angle λ is formed between the inclined surface 83 and a central axis Y3 of each depression structure 82. The inclined angle λ is substantially greater than 45°; that is, the angle between two inclined surfaces 83 is obtuse. The plane 84 is positioned in a substantial center of each depression structure 82, and the inclined surface 83 surrounds the plane 84 that is substantially parallel to the surface 81a of the main body 81. In other words, the depression structures 82 are exemplified by fillisters.

Figure 5:
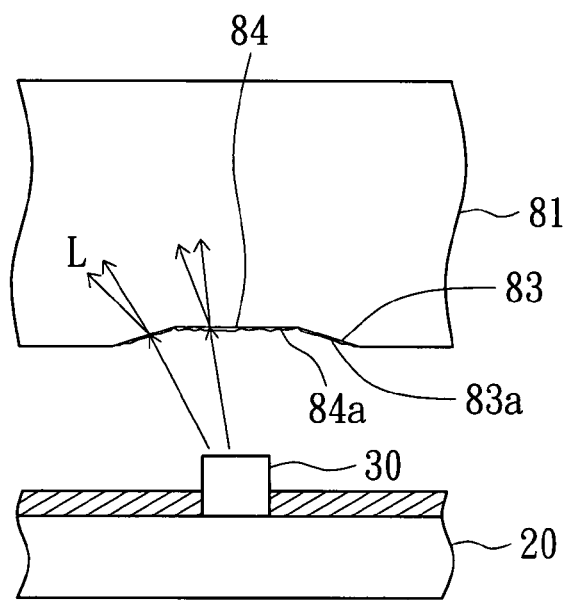
FIG. 5 illustrates the inclined surface and the plane in FIG. 4 having a first micro-structure and a second micro-structure respectively.

Furthermore, a rough first micro-structure and a rough second micro-structure are formed on the inclined surface 83 and the plane 84 of each depression structure 82 respectively. Referring to FIG. 5, the inclined surface and the plane in FIG. 4 having the first micro-structure and the second micro-structure respectively are illustrated. When the light L passes through the inclined surface 83 and the plane 84, the light L is refracted into several directions by the first micro-structure 83a and the second micro-structure 84a, so that the light L is uniformized.

In the diffusion plate of the backlight structure and the display device using the same according to the embodiments of the present invention, the light generated by the light emitting diodes is refracted into several directions by the depression structure of the main body of the diffusion plate. As a result, the light is uniformized, and line-mura is reduced. The diffusion plate of backlight structure and display device according to the preferred embodiments described above have various advantages, for example:

1. The light is refracted into several directions by the depression structures. The distance between the main body and the light emitting diodes is reduced, and the volume of the display device is decreased accordingly.

2. To uniformize the light, simply forming several depression structures on the component of a conventional backlight module, such as the diffusion plate and the light guide plate. Thus, the developing cost for a new component is saved, and the overall cost is not increased.

3. The backlight module then provides a backlight source with low line-mura through the depression structures, which improves the display quality of the display device.

4. The light generated by the light emitting diodes enters the main body directly through the inclined surface and the plane of the depression structures, or the surface of the main body. The loss of brightness of the light emitting diodes is reduced.

While the invention has been described by way of example and in terms of preferred embodiments, it is to be understood that the invention is not limited thereto. Rather, it is intended to cover various modifications and similar arrangements and procedures, and the scope of the appended claims therefore should be accorded the broadest interpretation so as to encompass all such modifications and similar arrangements and procedures.

What is claimed is:

1. A diffusion plate for use in a backlight structure with a plurality of light emitting diodes, comprising:
   a main body having a plurality of depression structures disposed thereon, the depression structures being positioned on a surface of the main body, the surface facing the light emitting diodes, each depression structure being positioned over the corresponding light emitting diode and comprising:
      an inverted triangle having an apex, wherein said apex corresponds to a central axis of the corresponding light emitting diode for refracting light emitted by the corresponding light emitting diode;
   wherein a depth of a central portion of each depression structure is deeper than that of an outer portion of each depression structure.

2. The diffusion plate according to claim 1, wherein the inclined surface has a rough micro-structure formed thereon for refracting the light into a plurality of directions when the light passes through the inclined surface.

3. The diffusion plate according to claim 1, wherein the main body is transparent, and the light emitted by each light emitting diode enters and passes through the main body through the inclined surface of the corresponding depression structure or the surface of the main body.

4. The diffusion plate according to claim 1, wherein the inclined angle is substantially greater than 45°.

5. The diffusion plate according to claim 1, wherein each depression structure is symmetric and has a symmetrical axis, the symmetrical axis coinciding with the central axis of the corresponding light emitting diode.

6. The diffusion plate according to claim 1, wherein the depression structures comprise cones.

7. The diffusion plate according to claim 1, wherein the depression structures comprise polyhedral cones.

8. A backlight structure comprising:
   a light source assembly comprising:
      a plurality of light emitting diodes; and
   a diffusion plate, positioned over the light source assembly, comprising:
      a main body disposed at a distance from the light emitting diodes, a plurality of depression structures being formed on a surface of the main body, the surface facing the light emitting diodes, each depression structure being positioned over the corresponding light emitting diode and comprising:
         an inverted triangle having an apex, wherein said apex corresponds to a central axis of the corresponding light emitting diode for refracting light emitted by the corresponding light emitting diode;
      wherein a depth of a central portion of each depression structure is deeper than that of an outer portion of each depression structure.

9. The backlight structure according to claim 8, wherein the inclined surface has a rough micro-structure formed thereon, and when the light emitted by the corresponding light emitting diode passes through the inclined surface, the light is refracted into a plurality of directions by the micro-structure.

10. The backlight structure according to claim 8, wherein the light source assembly further comprises:
    a circuit board; and
    a reflection sheet, disposed on the circuit board, having a plurality of openings, the light emitting diodes being disposed on the circuit board through the openings.

11. The backlight structure according to claim 8, wherein the main body is transparent, and the light emitted by each light emitting diode enters and passes through the main body through the inclined surface of the corresponding depression structure or the surface of the main body.

12. The backlight structure according to claim 8, wherein the inclined angle is substantially greater than 45°.

13. The backlight structure according to claim 8, wherein each depression structure is symmetric and has a symmetrical axis coinciding with the central axis of the corresponding light emitting diode.

14. The backlight structure according to claim 8, wherein the depression structures comprise cones.

15. The backlight structure according to claim 8, wherein the depression structures comprise polyhedral cones.

16. The backlight structure according to claim 8, wherein the distance is substantially greater than or equal to 7 millimeters.

17. The backlight structure according to claim 8, wherein the light emitting diodes are top emitting light emitting diodes.

18. A display device comprising:
    a display panel;
    a light source assembly disposed under the display panel and comprising:
       a plurality of light emitting diodes for providing light passing through the display panel; and
    a diffusion plate positioned between the light source assembly and the display panel and comprising:
       a main body disposed at a distance from the light emitting diodes, a plurality of depression structures being formed on a surface of the main body, the surface facing the light emitting diodes, each depression structure being positioned over the corresponding light emitting diode and comprising:
          an inclined surface for refracting the light, an inclined angle formed between a central axis of the corresponding light emitting diode and the inclined surface;
       wherein a depth of a central portion of each depression structure is deeper than that of an outer portion of each depression structure.

19. The display device according to claim 18, wherein the inclined surface has a rough micro-structure formed thereon, and when the light passes through the inclined surface, the light is refracted into a plurality of directions by the micro-structure.

20. The display device according to claim 18, wherein the light source assembly further comprises:
    a circuit board; and
    a reflection sheet, disposed on the circuit board, having a plurality of openings, the light emitting diodes being disposed on the circuit board through the openings.

21. The display device according to claim 18, wherein the inclined angle is substantially greater than 45°.

22. The display device according to claim 18, wherein each depression structure is symmetric and has a symmetrical axis coinciding with the central axis of the corresponding light emitting diode.

23. The display device according to claim 18, wherein the depression structures comprise cones.

24. The display device according to claim 18, wherein the depression structures comprise polyhedral cones.

25. The display device according to claim 18, wherein each depression structure further comprises:

a plane positioned in a substantial center of each depression structure, the inclined surface surrounding the plane substantially parallel to the surface.

26. The display device according to claim 25, wherein the plane has a rough first micro-structure formed thereon, and the inclined surface has a rough second micro-structure formed thereon, when the light passing through the inclined surface and the plane, the light being refracted into a plurality of directions by the first micro-structure and the second micro-structure.

27. The display device according to claim 25, wherein the depression structures comprise fillisters.

28. The display device according to claim 18, wherein the distance is substantially greater than or equal to 10 millimeters.

29. The display device according to claim 18, wherein the diffusion plate and the light source assembly form a backlight structure of the display device.

30. The display device according to claim 18, wherein the light emitting diodes are top emitting light emitting diodes.

31. The display device according to claim 18, wherein the main body is transparent, and the light enters and passes through the main body through the inclined surface of the corresponding depression structure or the surface of the main body.

* * * * *